Jan. 27, 1970  H. J. OYLER  3,491,678
BARBECUE COOKING OVEN
Filed Aug. 7, 1968  5 Sheets-Sheet 1
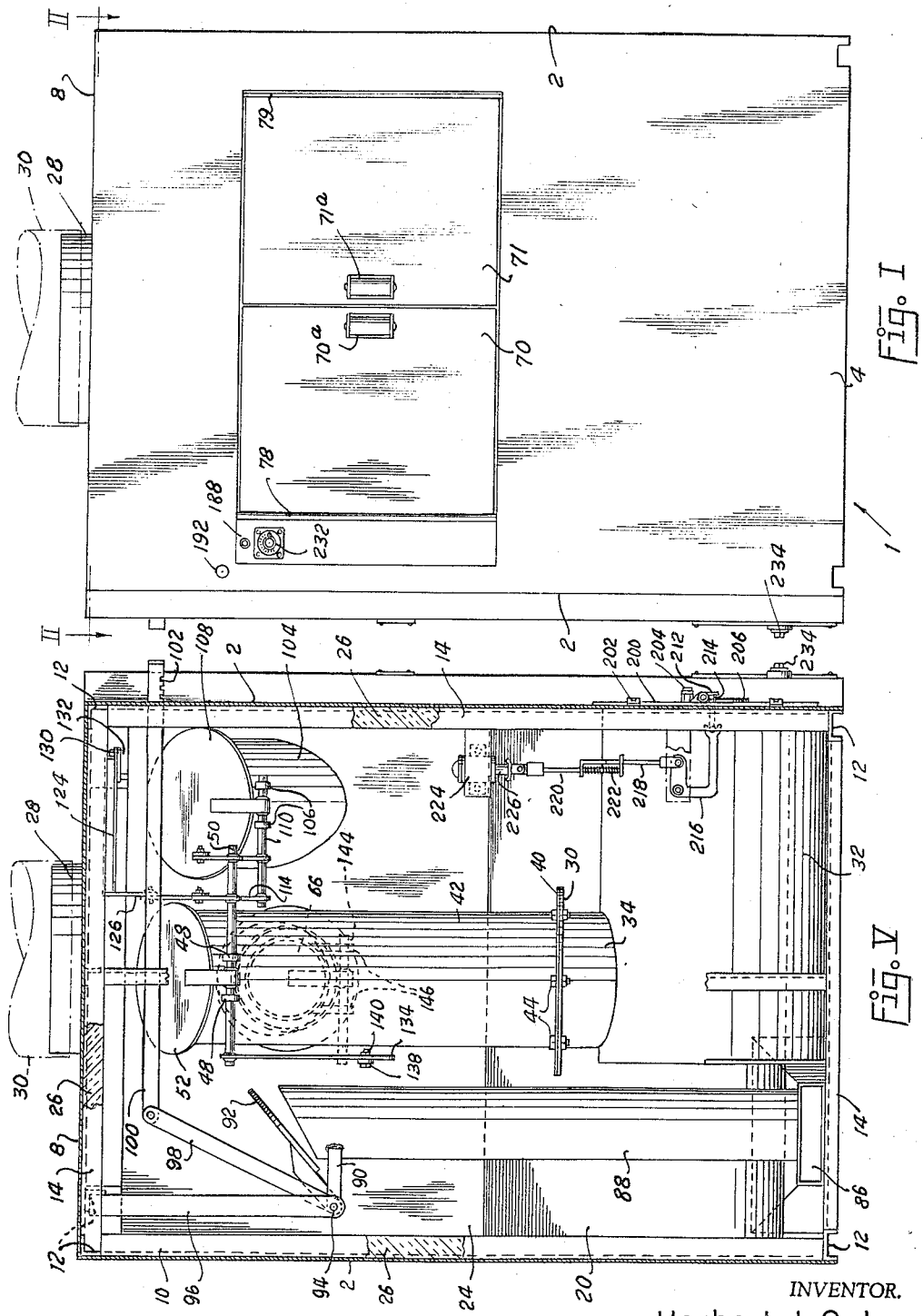
INVENTOR.
Herbert J. Oyler
BY Howard E. Moore
ATTORNEY

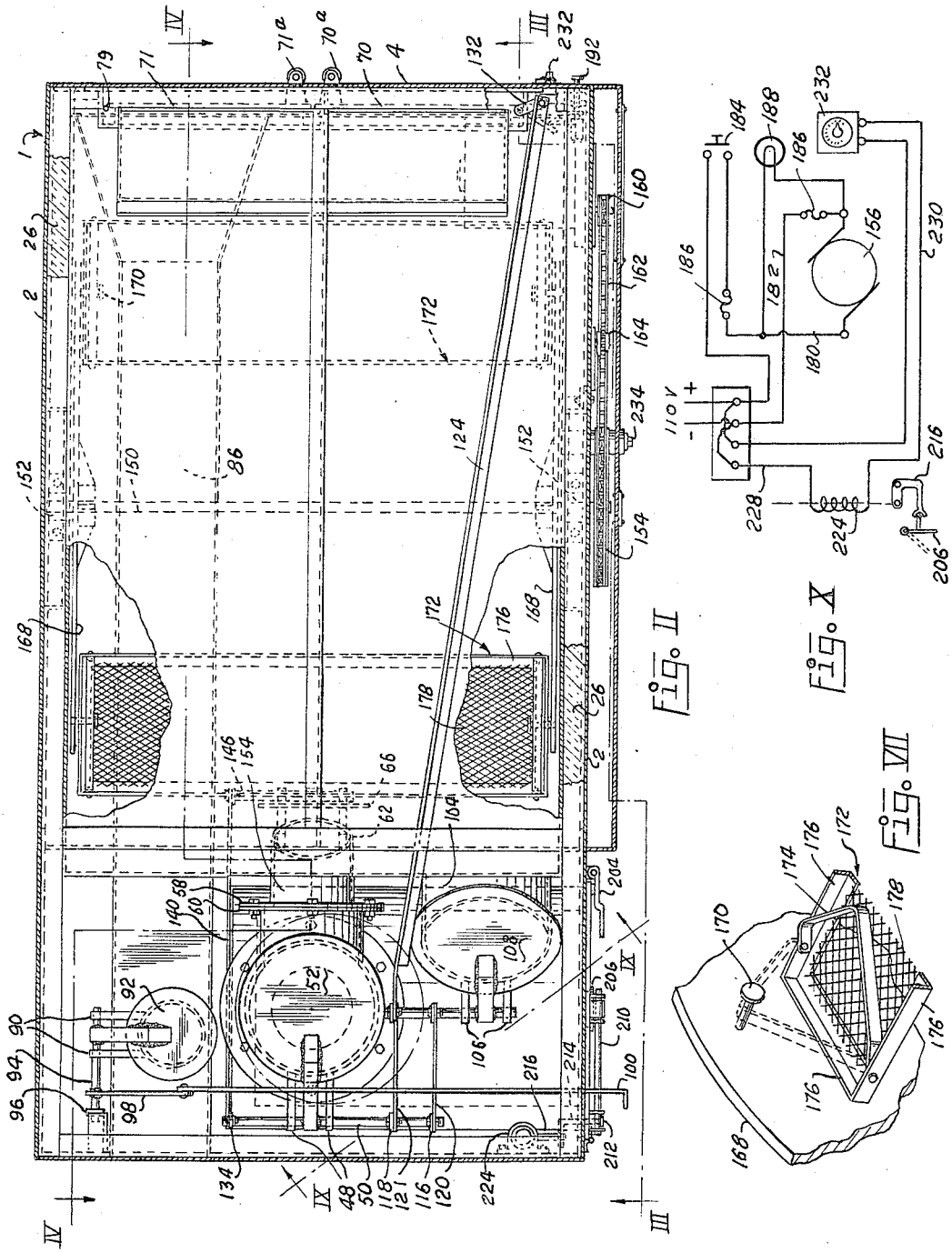

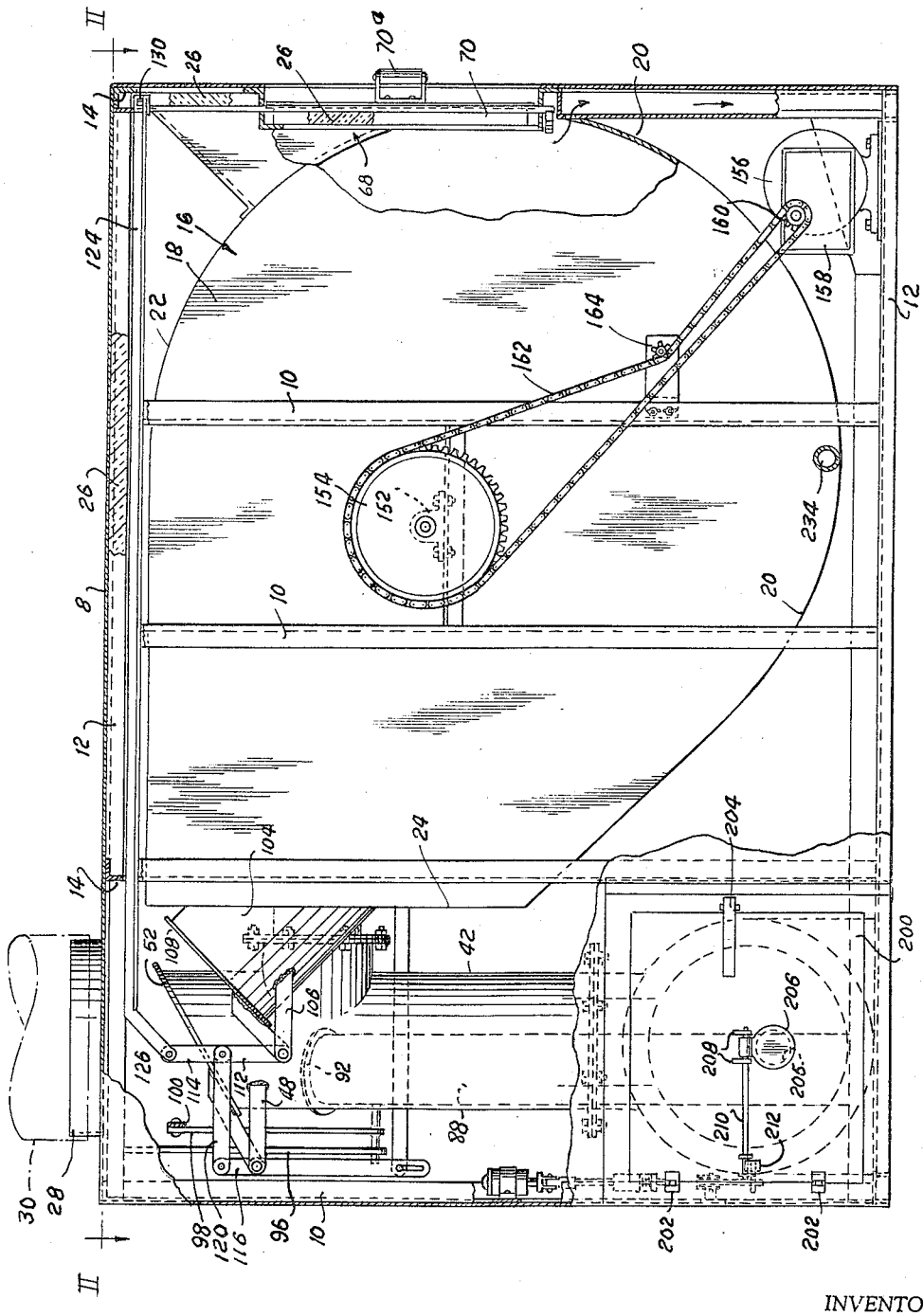

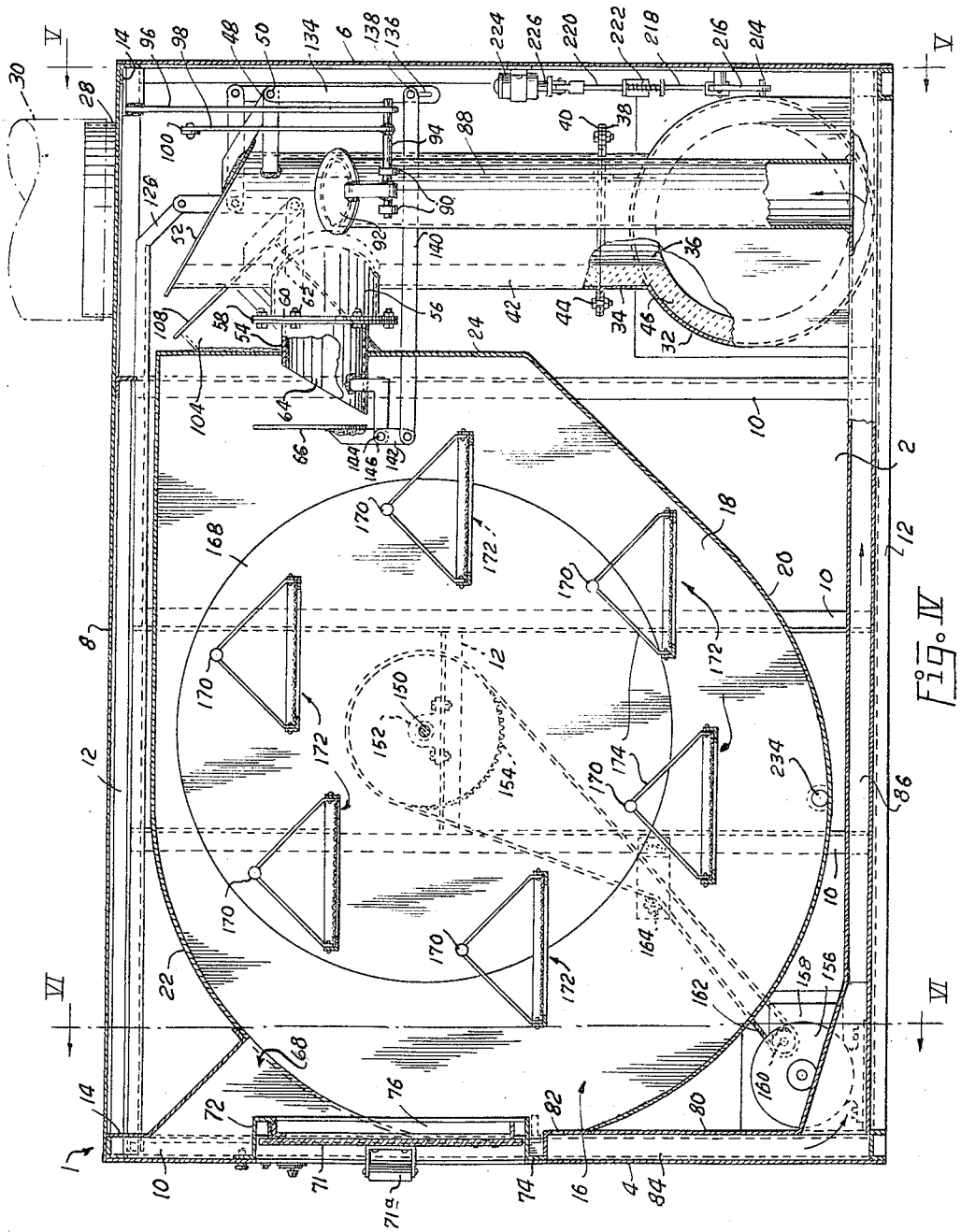

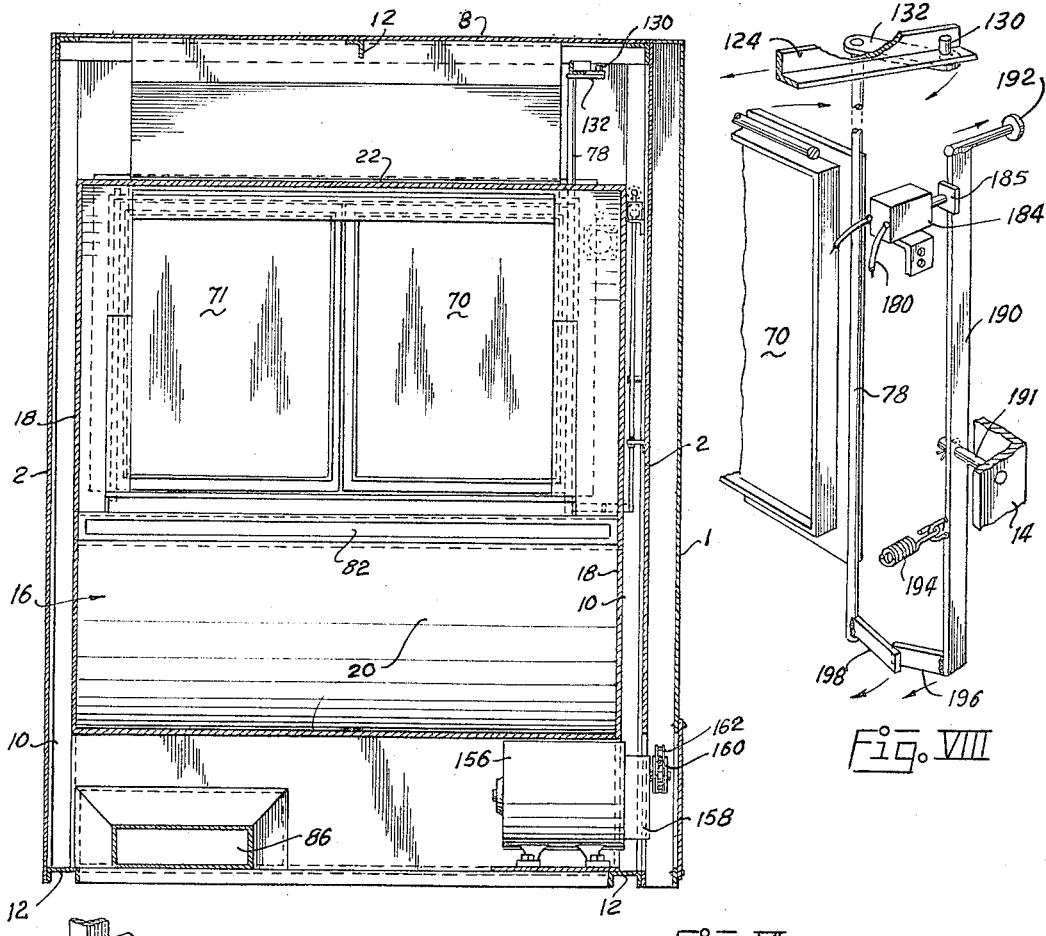
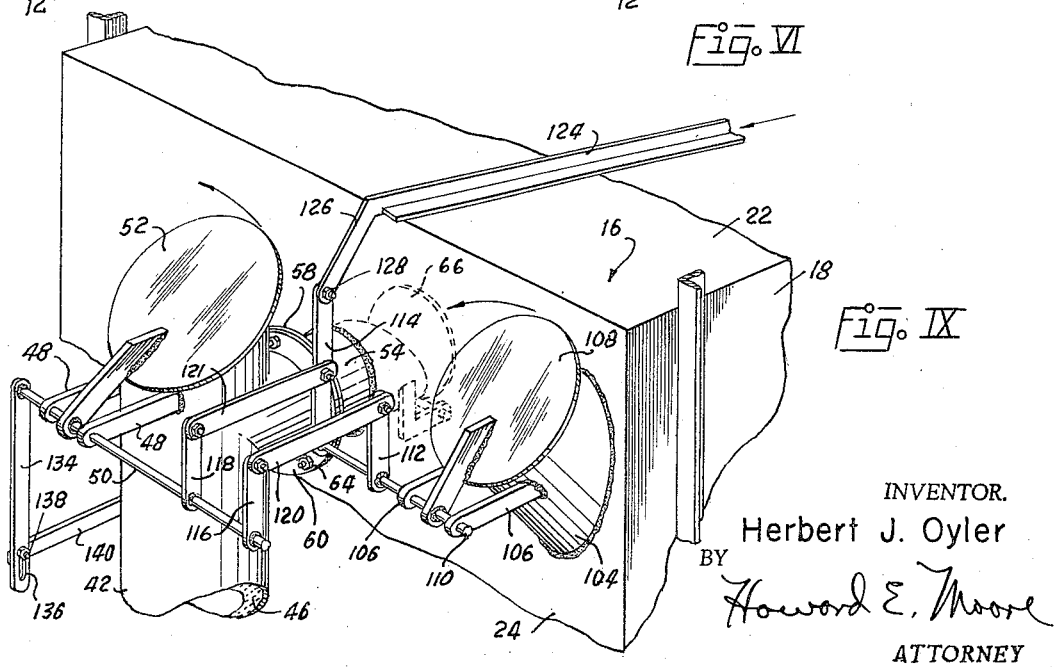

United States Patent Office 3,491,678
Patented Jan. 27, 1970

3,491,678
BARBECUE COOKING OVEN
Herbert J. Oyler, 5108 Elkridge Drive,
Dallas, Tex. 75227
Filed Aug. 7, 1968, Ser. No. 750,973
Int. Cl. F24b *11/00;* F23n *3/08, 5/24*
U.S. Cl. 99—259                  14 Claims

ABSTRACT OF THE DISCLOSURE

An improved cooking oven having automatic controls for regulating the heat emanating from a wood burning firebox and mechanical linkages for ejecting smoke and hot gases from the oven when the doors are open to prevent a backdraft of smoke into the building in which the oven is installed.

Background of the invention

The present invention is an improvement over my previous inventions disclosed and claimed in U.S. Patent No. 3,041,959 issued July 3, 1962, entitled "Means for Barbecuing Meat," and U.S. Patent No. 3,266,409 issued Oct. 16, 1966, entitled "Barbecuing Oven."

The aforementioned patents are directed to barbecuing ovens in which hot gases and smoke from burning charcoal or wood is routed around meat placed on racks inside the oven. The temperature in the oven was thermostatically controlled and a damper was automatically operated by a solenoid when the door was opened to exhaust smoke and hot gases through a smokestack thereby providing a barbecue cooking oven which could be safely mounted inside a commercial eating establishment, and required a minimum of attention.

The barbecue oven disclosed herein includes features of the aforementioned patents, and in addition incorporates an improved arrangement of vent stacks and dampers for regulating the temperature and smoke content of the cooking compartment of the oven. The improvement disclosed herein also includes improved mechanisms for controlling the dampers, thereby overcoming difficulties encountered in the construction and maintenance of automatic barbecue cooking ovens heretofore employed.

The structure disclosed in the aforementioned patents allowed smoke and hot gases to travel through the oven from the firebox to the vent stack or flue while the doors of the cooking compartment were open. No means was provided to prevent smoke and hot gases from being drawn through the doors by a backdraft.

Meat cooking ovens heretofore employed utilized fixed racks for supporting the meat. This construction did not efficiently utilize space inside the oven.

Solenoid operated vent dampers, disclosed in the aforementioned patents, presented maintenance problems. The malfunction of a single exhaust damper solenoid could cause an entire eating establishment to be filled with smoke when the doors of the cooking oven were opened.

Barbecuing ovens of the type indicated utilized a solenoid for opening the damper on the firebox, allowing air to pass therethrough for combustion of the wood inside the fire box. A low intensity buzzing sound was generated by the solenoid when it was energized. The firebox door and the solenoid for operating the damper thereon were positioned in front of the barbecuing oven adjacent to the doors of the cooking compartment. The buzzing sound was annoying to persons working in the vicinity thereof and the firebox damper was often kicked or propped shut to alleviate the annoyng buzzing sound. Kicking the damper tended to damage the equipment, and propping the damper in the closed position made the fire go out which was detrimental to the cooking process.

Summary of the invention

I have developed an improved barbecue cooking oven incorporating features of the devices disclosed in Patent Nos. 3,041,959 and 3,266,409 together with additional features for increasing the efficiency and durability of the oven.

The present invention includes a new arrangement of vent stacks together with improved mechanism for controlling dampers to channelize smoke and heat through the cooking compartment.

A novel meat rack arrangement is provided offering maximum utilization of space, easy cleaning for maintaining sanitation, and convenience in loading and unloading the racks.

The firebox and the associated damper solenoid have been repositioned to the rear of the cooking compartment. This increases the efficiency of the cooking process and moves the buzzing sound generated by the solenoid out of earshot of persons in the vicinity of the oven doors. An improved linkage is provided on the firebox damper to prevent damage thereto if the damper is kicked.

It is, therefore, a primary object of the invention to provide an improved barbecue cooking oven for automatically controlling the temperature inside of the cooking oven and for controlling the path of smoke and heat therethrough, providing optimum cooking conditions for enhancing the flavor and tenderness of the meat.

Another object of the invention is to provide an improved barbecuing oven, eliminating the possibility of the escape of smoke from cooking compartment doors by providing a positive closure between the firebox and the cooking compartment when the doors are open, to prevent backdraft.

Another object of the invention is to provide an improved barbecuing oven having rotating shelves or meat racks whereby the cooking compartment may be loaded or unloaded with meat quickly and easily.

A further object of the invention is to provide dampers, automatically operated when the cooking compartment doors are opened, for venting the firebox to a flue.

A still further object of the invention is to provide an improved barbecuing oven wherein the meat racks are rotated through an envelope of smoke and heat, providing uniform cooking of all portions of the meat.

A still further object of the invention is to provide an improved barbecuing oven having meat racks which are easily removed and cleaned to facilitate maintenance of sanitary conditions.

A still further object of the invention is to provide a barbecuing oven having a curved configuration offering minimum resistance to convection currents flowing therethrough and offering a compartment which is easily cleaned and maintained in a sanitary condition.

A further object of the invention is to provide an improved barbecuing oven wherein the firebox and dampers controlling the rate of airflow therethrough are disposed in a remote position from the meat compartment doors, thereby providing sanitary conditions in that the meat and fuel are loaded from different locations, thereby reducing the temptation of persons in the vicinity of the cooking compartment doors tampering with the firebox damper.

Another object is to provide an improved automatic barbecue oven which can safely be mounted inside a commercial eating establishment, which is attractive and occupies a minimum of space.

Other and further objects of the invention will become apparent upon reading the detailed specification hereinafter following, and by referring to the drawings annexed thereto.

Description of the drawing

The accompanying drawings, illustrating a preferred embodiment of the invention, are provided so that the invention may be better and more fully understood in which:

FIGURE I is a front elevational view of the barbecue cooking oven incorporating the improvements comprehended by this invention;

FIGURE II is a cross sectional view taken along lines II—II of FIGURE I;

FIGURE III is a cross sectional view taken along lines III—III of FIGURE II;

FIGURE IV is a cross sectional view taken along lines IV—IV of FIGURE II;

FIGURE V is a cross sectional view taken along lines V—V of FIGURE IV.

FIGURE VI is a cross sectional view taken along lines VI—VI of FIGURE IV;

FIGURE VII is an enlarged fragmentary perspective view of a portion of a typical meat rack;

FIGURE VIII is a fragmentary perspective view of a portion of the cooking oven door together with structure utilized for actuating the dampers, and stopping rotation of the meat racks;

FIGURE IX is an enlarged fragmentary perspective view looking in the direction indicated by the arrows along line IX—IX of FIGURE II; and FIGURE X is a wiring diagram of the electrical circuit employed in the present invention.

Numeral references are employed to designate the various parts shown in the drawings, and like numerals indicate the like parts throughout the various figures of the drawings.

Description of a preferred embodiment

The numeral 1 indicates the general housing of the barbecue cooking oven which includes outer sidewalls 2. outer frontwall 4, an outer backwall 6 and a top 8.

The outer general housing may be constructed of any suitable material such as sheet metal panels. Components of the general housing 1 are maintained in spaced apart relation from cooking oven 16, comprising sides 18, a curved bottom 20, curved top 22 and back 24, by any suitable vertical members 10, longitudinal members 12 and transverse members 14.

Any suitable insulation material 26, such as fiberglass, steel wool or asbestos, is placed around cooking oven 16 on the inside of general housing 1, whereby the general housing 1 may be connected to any desired construction material without creating a fire hazard. Insulation 26 also tends to capture and retain heat in cooking oven 16, thereby minimizing the amount of fuel required to raise the temperature thereof to the desired level.

Insulation material 26 may also be installed beneath cooking oven 16 or in any other location to prevent heating of floors or structural members.

Cooking oven 16 may be aedquately insulated, making it feasible to install all or any portion of general housing 1 in an air conditioned room.

A flue passage through common stack 28 extends through the top 8 of general housing 1, communicates with space behind back 24 of cooking oven 16, and is adapted to be connected to a flue pipe 30 for removing heat and smoke therefrom. Any suitable flue transition connections may be utilized for connecting common stack 28 to flue pipe 30.

The firebox 32 is disposed inside general frame 1 in a lower portion thereof behind cooking oven 16. Firebox 32 is of generally circular configuration and has an outwardly extending portion 34 in an upper portion thereof, forming a firebox exhaust passage through opening 36 through which smoke and heated gases of combustion may escape. The outwardly extending portion 34 of firebox 32 has a flange 38 thereon, having spaced holes extending therethrough for connecting thereto flange 40 on the lower end of stack 42 by bolts 44.

It should be noted that firebox 32 and stack 42 are lined with refractory material 46 to insulate and to prevent burning thereof.

The circular or arcuate inner surfaces of firebox 32 offer a significant improvement over the generally rectangular fireboxes hereinbefore utilized. The curved configuration of the firebox reduces frictional loss and thereby increases the velocity of smoke and heat passing therefrom.

It is essential that the gases of combustion be delivered to cooking oven 16 as quickly as possible to reduce heat loss. The circular configuration of firebox 32 substantially increases the efficiency of the cooking oven and offers significant savings in fuel cost.

It should be noted that firebox 32 may be replaced by merely removing bolts 44 extending through flanges 38 and 40. Rapid heating and cooling of firebox 32, may under certain adverse conditions, cause refractory material 46 to break or crack. Throwing logs and the like in the firebox may also damage same. Structure, hereinbefore described, makes it possible to replace firebox 32 quickly and easily without replacing stack 42 and associated components thereof.

Referring to FIGURES IV and V of the drawing, stack pipe 42 has spaced lugs 48 welded or otherwise rigidly secured thereto adjacent the upper end thereof. Each of the spaced lugs 48 has a hole therethrough in which a shaft 50, welded or otherwise rigidly connected to damper 52, is rotatably journaled. As will be hereinafter more fully explained, damper 52 is in the closed position when the door 70 of cooking oven 16 is closed and seals the upper end of stack 42.

Connectors 54 and 56 surround openings in the back 24 of cooking oven 16 and in the side of stack 42 respectively. Connectors 54 and 56 each has flanged portions 58 and 60 joined by bolts 62. Connectors 54 and 56 have aligned openings therethrough forming a passage 64 through which smoke and gases of combustion are delivered to the inside of cooking oven 16.

Connector 54, extending through backwall 24 of cooking oven 16, has a damper 66 pivotally connected to the inner end thereof. As will be hereinafter more fully explained, damper 66 is normally in the open position, said damper closing passage 64 when the doors 70 and 71 of cooking oven 16 are opened.

Smoke and heated gases entering through inlet passage 64 from firebox 32 are transferred through cooking oven 16 by the motion of the hot gases. The curved top 22 and bottom 20 of cooking oven 16 are arranged to exert minimum resistance to convection currents of smoke and gases thereacross.

Cooking oven 16 has a substantially vertical backwall 24 and a diverging section defined by curved top 22 and bottom 20. eliminating dead spaces within the oven.

Convection currents through cooking oven 16, unimpeded by obstructions, completely fill oven 16 with uniformly heated gases for cooking and forms an envelope of smoke surrounding meat disposed therein.

As best illustrated in FIGURES IV and VI, cooking oven 16 has an opening 68 in top 22 adjacent the front end of said oven. An access opening is provided in front 4 of the general housing 1, having doors 70 and 71 mounted therein. A suitable doorframe, having a header 72, sill 74 and vertical side members 76, is bolted or otherwise rigidly connected about the opening in the front panel 4 to receive doors 70 and 71. Each of the said doors is rigidly connected adjacent the outer edge thereof to pivot pins 78 and 79 respectively, which are rotatably journaled in header 72 and sill 74, whereby said doors may be opened providing access to the inside of cooking oven 16.

A wall 80 extends downwardly from sill 74 and is positioned in parallel spaced apart relation from front 4 of the general housing 1.

Wall 80 has a slot 82 adjacent the upper end thereof, immediately below sill 74. Slot 82 connects the inside of cooking oven 16 with space 84 between walls 4 and 80. Wall 80 has an opening in the lower end thereof connecting space 84 with the inside of return passage or duct 86 which extends longitudinally of and adjacent to one side of general frame 1.

Stack 88 extends upwardly from and communicates with the inside of return passage 86. Stack 88 has spaced lugs 90 welded or otherwise rigidly secured thereto, each of said lugs having aligned openings therethrough.

A damper 92 is rigidly connected to pin 94 rotatably journaled in lugs 90. Pin 94 extends outwardly beyond one lug 90 and has the free end thereof rotatably journaled in a hanger 96 suspended from one of the longitudinal members 12 adjacent the top of the general housing, best illustrated in FIGURES II, IV and V.

An actuating arm 98 is rigidly connected to pin 94 between lug 90 and hanger 96 and extends upwardly therefrom. The upper end of actuating arm 98 is pivotally connected to one end of actuating link 100. Link 100 extends transversely across a rear portion of the general housing and extends through an opening in sidewall 2 of the general frame. Link 100 has spaced notches 102 adjacent the end thereof adapted to engage the lower edge of the opening through sidewall 2.

From the foregoing it should be readily apparent that longitudinal movement of link 100 rotates actuating arm 98 and pin 94 thereby imparting rotation to damper 92, providing a means for regulating the size of the opening in stack 88 and for controlling the draft through the cooking oven 16.

An opening is provided in back 24 of cooking oven 16 in spaced apart relation from connector 54. An oven exhaust passage extends through stack 104 welded or otherwise rigidly secured about the said opening and extending outwardly and upwardly therefrom. Spaced lugs 106 are welded or otherwise rigidly secured to the stack 104 and have aligned holes therethrough. A damper 108 is rigidly connected to shaft 110 rotatably journaled in the aligned holes in lugs 106. As will be hereinafter more fully explained, damper 108 closes the end of stack 104 when doors 70 and 71 of cooking oven 16 are closed. Opening doors 70 and 71 automatically opens damper 108, allowing smoke and heated gases to escape through stack 104, through common stack 28 and flue pipe 30.

Shaft 110 extends outwardly from one of the lugs 106 and has cranks 112 and 114 welded or otherwise rigidly secured thereto in spaced apart relation.

As best illustrated in FIGURE IX, shaft 50 extends outwardly from each of the lugs 48 on stack 42. One end of each lever 116 and 118 is welded in spaced apart relation to shaft 50 and has the other end thereof pivotally connected by links 120 and 121 respectively, to cranks or levers 112 and 114.

An exhaust damper actuating rod 124, disposed between top 22 of cooking oven 16 and top 8 of general housing 1, has a downwardly extending portion 126 pivotally connected by a bolt 128 to the upper end of lever 114.

Referring to FIGURES II, VIII and IX, actuating rod 124 has the other end thereof pivotally connected to pin 130 extending outwardly from lever 132, rigidly connected to the upper end of pin 78, upon which door 70 is mounted.

It will be readily appreciated that force exerted on handle 70a will cause door 70 to pivot, rotating pin 78 and link 132. Rotation of link 132 imparts longitudinal motion to actuating rod 124 which in turn exerts forces through levers 114 and 118, connected by links 120 and 121, to rotate shafts 50 and 110. Rotation of shafts 50 and 110 opens damper 52 on stack 42 and damper 108 on stack 104.

Shaft 50 has a lever 134 rigidly secured to the other end thereof in spaced apart relation from levers 118 and 116. Lever 34 has a slotted opening 136 in the lower end thereof having a bolt 138 extending therethrough for pivotally connecting same to one end of link 140.

Link 140 extends between the lower end of lever 134 and the lower end of lever 142, rigidly connected to pin 144, rotatably journaled in lugs 146 on connector 54. Damper 66 is welded or otherwise rigidly secured to pin 144.

It should be readily appreciated that rotation of shaft 50, when door 70 is opened, causes force to be exerted through lever 134, link 140, lever 142 and pin 144 to move damper 66 to the closed position.

It is important to note that force exerted through actuating rod 124 and the mechanical linkage connected thereto, when the door 70 of the cooking compartment 16 is opened, simultaneously opens dampers 52 and 108 and closes damper 66.

The aforementioned dampers are manipulated to close passageway 64 between firebox 32 and the inside of cooking oven 16 while heat and smoke are exhausted from the firebox through stack 42 and from the cooking oven 16 through stack 104 and prevents smoke from exiting through open doors 70 and 71.

An axle 150 is rotatably journaled in bearings 152 rigidly connected to suitable supports 12 outwardly of sidewall 18 of cooking compartment 16. Axle 150 extends through openings in sides 18 and extends transversely across cooking oven 16. A sprocket 154, FIGURES II, III and IV, is rigidly connected to one end of shaft 150.

A motor 156 is disposed in the lower portion of general frame 1 in driving relation with gearbox 158 having a sprocket 160. A chain 162 extends around sprockets 160 and 154 for transmitting power from motor 156 to axle 150 to rotate same.

Any suitable means, such as idler gear 164, may be employed for adjusting tension in chain 162.

Suitable circular rack mounting members 168 are rigidly connected to shaft 150 in spaced apart relation between walls 18 of cooking oven 16. Support pins 170 are positioned in spaced apart relation on mounting members 168.

Referring to FIGURE II, IV and VII, cooking racks 172 are pivotally suspended between pins 170 on rack mounting members 168 and extend transversely across cooking oven 16.

Each cooking rack 172 has a bail 174 pivotally connected to each side thereof extending upwardly around pin 170. As best illustrated in FIGURE VII, each bail 174 may be pivoted inwardly to disengage pins 170, allowing each rack 172 to be removed for cleaning or to facilitate placing meat thereon.

Racks 172 may be of any suitable construction. However, the particular embodiment illustrated in the drawing shows a frame constructed of angle members 176 having expanded metal or wire mesh 178 extending across the bottom thereof.

It should be appreciated that power from motor 156 is transmitted through gearbox 158, sprocket 160, chain 162, sprocket 154, axle 150, mounting members 168 and pins 170 to impart rotation to meat racks 172. As racks 172 are rotated they remain in horizontal position by virtue of the pivotal suspension thereof on the circular mounting members 168.

While meat racks 172 may be mounted on stationary supports inside cooking oven 16, the important advantages achieved by rotating the racks should not be overlooked. Each rack 172 is conveniently accessible through doors 70 and 71 of the cooking oven. Greater quantities of meat may be cooked. More uniform heating of oven 16 is achieved because stationary racks tend to channelize heat, resulting in uneven distribution thereof.

Motor 156 is connected to a suitable source of electric power through lines 180 and 182. A push button switch 184 is disposed in line 180 for opening and closing the circuit through motor 156. Circuit breakers or other safety devices, such as fuses 186, may be utilized to prevent overloading of the circuit.

A pilot light 188 is connected in parallel with motor 156, said light 188 being on when current is being delivered to said motor.

As best seen in FIGURE VIII, a rod 190, pivotally connected to a vertical member 14 adjacent to a front corner of general cabinet 1, extends vertically adjacent push button 185 of switch 184 and has a button 192 rigidly connected to the upper end thereof. Rod 190 is urged away from button 185 of switch 184 by a spring 194 connected to the lower end thereof. A dog 196, rigidly connected to the lower end of rod 190, is engageable with lever 198 rigidly connected to the lower end of door mounting pin 78.

Button 192 extends outwardly through frontwall 4 of general housing 1 and is readily accessible from the vicinity of doors 70 and 71 of cooking oven 16.

Pilot light 188 is also disposed on the front of general cabinet 1 and is visible from the vicinity of doors 70 and 71.

When door 70 is in the closed position lever 198 engages dog 196 urging rod 190 against button 185 of switch 184 causing the movable contact thereof to close, making a circuit through line 180 to deliver current to motor 156. When door 70 is opened lever 198 disengages dog 196 causing spring 194 to pivot rod 190 away from button 185 breaking the circuit thereby de-energizing motor 156, causing meat racks 172 to stop rotating.

Meat racks 172 may be rotated while the door is opened by exerting force against button 192, causing rod 190 to rotate to close switch 184. When button 192 is released the racks stop rotating.

As heretofore pointed out, firebox 32 is disposed in a rear portion of general frame 1 and is accessible from the outside thereof. A firebox door 200 is pivotally mounted on hinges 202 and is normally maintained in the closed position by a latch 204. Door 200 may be opened for placing wood or charcoal in firebox 32 or for removing ashes therefrom.

Firebox door 200 has an opening therethrough, the area of the opening being controlled by damper 206, best illustrated in FIGURES III, IV and V.

Lugs 208 are welded or otherwise rigidly connected to firebox door 200 above opening 205 therethrough. Damper 206 is welded or otherwise rigidly connected to shaft 210 rotatably journaled in aligned holes in lugs 208. Shaft 110 extends outwardly from one of the lugs 208 and has an actuating plate 212 rigidly connected thereto.

A pin 214 is slideably disposed in an opening through firebox door 200 and is engageable with actuating plate 212 on shaft 210. As best illustrated in FIGURE V, bell crank 216 is pivotally mounted on backwall 6 of the general frame, having one end thereof engageable with the pin 214. The other end of bell crank 216 is pivotally connected to rod 218, which is slideably connected to rod 220, having a spring 222 disposed between opposing sections of rods 218 and 220.

Solenoid 224 has a movable core 226 pivotally connected to the upper end of rod 220.

Referring to FIGURE X, solenoid 224 is connected to a suitable source of electrical power through lines 228 and 230. Line 230 has a thermostatically controlled switching device 232 disposed therein, said switching device having a thermal responsive element within the oven. The operation of solenoid 224 is controlled by the thermostatically operated switch 232 which is normally closed, but is arranged to open when the temperature in the oven reaches a predetermined value. Therefore, solenoid 224 is normally energized, so that the core 226 is drawn into the solenoid 224, pulling upwardly on rods 220 and 218 and one end of bell crank 216 maintaining damper 206 in a raised position, to thereby permit air to be drawn through opening 205 into the firebox 32 to supply oxygen to the fuel therein.

When the heat in the oven reaches a predetermined maximum value, determined by setting of control on switch 232, thermostatically controlled switch 232 is caused to open, breaking the circuit supplying a current to the solenoid 224 thereby de-energizing said solenoid permitting damper 206 to close by force of gravity and expansion of spring 222. When damper 206 is in the closed position opening 205 is closed, thereby cutting off the supply of air to the fire in the firebox and reducing the combustion and heat emanating from fuel in the firebox. When the heat in oven 16 is reduced to a predetermined minimum value, thermostatically controlled switch 232 is again closed, energizing solenoid 224, opening damper 206 to permit a supply of air to the inside of firebox 32 and raising the heat.

This process is automatically repeated, thereby regulating the temperature in the oven 16.

In the event a force is exerted against door 206 in an attempt to close same while solenoid 224 is energized the spring 222 will absorb the force and prevent damage to the solenoid.

Thermostatically controlled switch 232 may be positioned in any desired location. However, it is desirable that it be positioned adjacent doors 70 and 71 on the front 4 of the general frame.

The operation and function of the device hereinbefore described is as follows:

Fire is ignited in firebox 32 to provide a suitable bed of coals therein to supply the heat and smoke, necessary for the barbecuing of the meat, which is disposed on racks 172 in cooking oven 16.

Damper 92 is manually placed in position so that it is normally open, utilizing link 100. Damper 92 may be adjusted to permit a desired amount of heat and smoke to pass from firebox 32 through stack 42, passage 64, to the inside of cooking oven 16, through slot 82, space 84, return duct 86, stack 88 and finally through common stack 28 to flue 30.

Damper 52 on the upper end of stack 42 and damper 108 on the upper end of stack 104 are normally closed while cooking so that no appreciable amount of heat or smoke can pass through the said stacks while the meat is cooking. However, as hereinbefore explained, when door 70 is opened, moving actuating rod 124, dampers 52 and 108 are opened and damper 66 is closed, sealing passage 64. This allows heat and smoke from firebox 32 to pass directly through stack 42 through common stack 28 to flue pipe 30. Smoke and heat in cooking oven 16 pass through stack 104 to common stack 28 and flue pipe 30. Damper 66 closes the passageway 64 between the inside of cooking oven 16 and firebox 32 to keep heat from flowing therethrough into cooking chamber 16 and through open door 70.

When door 70 is closed, damper 66 is again opened and dampers 52 and 108 are simultaneously closed. It will be seen that heat, gases and smoke emanating from fuel in firebox 32 are required to pass around racks 172 to seek exit through passage 82 at the front of the cooking compartment. Therefore, the heat and smoke is concentrated and distributed over the meat, so that virtually none of the heat or smoke is wasted and the meat is uniformly cooked and flavored.

By virtue of the regulation of temperature in the oven by means of the automatically operated firebox damper 206, the meat is uniformly cooked, and may be cooked for a longer period of time without searing or burning than would ordinarily be feasible.

Furthermore, the meat is uniformly exposed to smoke and flavor from the burning charcoal or wood in the firebox 32 so that the flavor uniformly penetrates the meat while it is being cooked. Moreover, the meat is not directly exposed to the burning fuel and there is no tendency for it to be seared or burned.

Another advantage of the construction described is that the grease which drips from the meat while it is being cooked falls on curved lower surface 20 of cooking oven 16 and drains to the lower portion thereof for removal through drain 234 and does not contact the live coals, but is isolated therefrom to prevent the danger of flames or explosion.

It will be seen that I have provided significant improvements over automatic barbecue cooking ovens hereinbefore developed. The smoked flavor uniformly penetrates the meat, which retains its natural juices and moisture, thus providing more tender cuts of meat which are of superior quality of flavor and texture than was possible hereinbefore.

The configuration of the cooking oven allows more uniform distribution of heat, increasing the overall efficiency of the oven and increasing the quality of the barbecue.

The improved damper arrangement is superior to that utilized hereinbefore and assures that smoke will not escape through the doors of the cooking compartment when same are opened and that all smoke and heat will be exhausted while the door is open.

The configuration of the firebox increases the efficiency thereof and reduces fuel cost.

The improved means for controlling the firebox damper incorporating resilient means therein prevents damage to the equipment if the firebox damper is forced closed.

Having described my invention, I claim:

1. In a cooking device, a general housing; an oven disposed in the housing; an access opening extending through a wall of the housing and the oven; a door hingedly mounted in the opening; a firebox disposed in the housing adjacent to the oven; an inlet passage connecting the inside of the firebox with the inside of the oven, said passage extending through a wall of the oven; a normally open damper in the inlet passage; a cooking rack mounted in and extending across the oven; a return passage extending through another wall of the oven, and communicating with the interior of the housing, a normally open damper in the return passage adapted to control draft therethrough; an oven exhaust passage through the upper wall of the oven adapted to communicate with the interior of the housing; a normally closed damper in the oven exhaust passage; a firebox exhaust passage through the upper wall of the firebox and communicating with the interior of the housing; a normally closed damper in the firebox exhaust passage; and means operably connected between the door and the dampers for automatically closing the normally open damper and opening the normally closed dampers when the door is opened, and a flue passage through the upper wall of the housing.

2. The combination called for in claim 1 wherein the means for closing the normally open damper and opening the normally closed dampers includes a mechanical linkage operably connected between the door and each of said dampers.

3. The combination called for in claim 2 wherein the mechanical linkage includes an actuating member having one end thereof operably connected to the door; a crank pivotally connected to the other end of the actuating member; a rotatable shaft connected to the crank and to at least one of the dampers; a second rotatable shaft; an actuating linkage between the first and second shafts to rotate them together, and linkages between the second shaft and the other dampers to operate same whereby opening the door moves the actuating member and the dampers connected to the shafts.

4. The combination called for in claim 1 wherein the upper inner surface of the firebox is curved and the inlet passage extends through an upper portion of said upper surface.

5. The combination called for in claim 1 with the addition of rack mounting members rotatably disposed adjacent opposite sides of the oven; means for pivotally connecting the rack to the mounting members at each end thereof; means connected to the mounting members for rotating the mounting members, said means being adapted to rotate the mounting members when the door is closed and to stop same when the door is open.

6. The combination called for in claim 5 wherein the means for rotating the mounting members comprises an axle rotatably journaled in opposite sides of the housing extending between and rigidly secured to the mounting members; a motor coupled with the axle to rotate same; and an electrical circuit for supplying electricity to the motor, said circuit including a switch for opening and closing the circuit to control operation of the motor.

7. The combination called for in claim 6 with the addition of means operably connecting the door to the switch whereby opening the door opens the switch and stops the motor and closing the door closes the switch and starts the motor.

8. The combination called for in claim 7 with the addition of means connected to the switch for manually closing same to start the motor when the door is open.

9. The combination called for in claim 7 with the addition of a pilot light in the circuit adapted to indicate when the motor is running.

10. The combination called for in claim 1 with the addition of means for detachably securing the oven exhaust passage to the firebox.

11. The combination called for in claim 1 wherein the oven comprises spaced sides; a curved top extending between and connected to the upper edges of the sides; a curved bottom extending between and connected to the lower edges of the sides; and a substantially vertical back extending between the sides, wherein the curved top and bottom intersect at the front of the oven.

12. The combination called for in claim 1 with the addition of an opening through a wall of the firebox; a damper adapted to close the opening; a solenoid operated linkage for opening the damper; temperature responsive means for energizing the solenoid; and a resilient member in the solenoid operated linkage to prevent damage thereto if the firebox damper is forced to close.

13. The combination called for in claim 1 with the addition of rack mounting members rotatably disposed adjacent opposite sides of the oven; a plurality of spaced racks mounted between the mounting members; means for pivotally mounting the racks to the mounting members at each end thereof; and means to rotate the mounting members.

14. The combination called for in claim 1 with the addition of means to manually adjust the opening of the damper in the return passage.

References Cited

UNITED STATES PATENTS

| | | | |
|---|---|---|---|
| 2,558,569 | 6/1951 | Koch | 99—260 |
| 3,041,959 | 7/1962 | Oyler | 99—260 |
| 3,069,998 | 12/1962 | Julian | 99—259 |
| 3,266,409 | 8/1966 | Oyler | 99—259 |

ROBERT W. JENKINS, Primary Examiner